(12) United States Patent
Mohammed et al.

(10) Patent No.: US 8,532,449 B2
(45) Date of Patent: Sep. 10, 2013

(54) WAFER INTEGRATED OPTICAL SUB-MODULES

(75) Inventors: Edris M. Mohammed, Beaverton, OR (US); Hinmeng Au, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 12/774,977

(22) Filed: May 6, 2010

(65) Prior Publication Data

US 2011/0274395 A1    Nov. 10, 2011

(51) Int. Cl.
*G02B 6/33* (2006.01)
*G02B 6/26* (2006.01)
*G02B 6/12* (2006.01)

(52) U.S. Cl.
USPC .................................. 385/33; 385/39; 385/14

(58) Field of Classification Search
USPC .................................. 385/33, 39, 14
See application file for complete search history.

(56) References Cited

U.S. PATENT DOCUMENTS

| | | | | |
|---|---|---|---|---|
| 6,002,459 A * | 12/1999 | Kaise et al. | ...... | 349/95 |
| 6,536,957 B1 * | 3/2003 | Buchter | ...... | 385/89 |
| 6,784,409 B2 * | 8/2004 | Kitani | ...... | 250/208.1 |
| 7,671,992 B2 * | 3/2010 | Ehbets et al. | ...... | 356/416 |
| 7,781,781 B2 * | 8/2010 | Adkisson et al. | ...... | 257/84 |
| 7,880,252 B2 * | 2/2011 | Funao | ...... | 257/432 |
| 8,076,172 B2 * | 12/2011 | Akiyama | ...... | 438/70 |
| 2001/0048064 A1 * | 12/2001 | Kitani | ...... | 250/208.1 |
| 2003/0025825 A1 * | 2/2003 | Nakajoh | ...... | 348/374 |
| 2004/0012698 A1 * | 1/2004 | Suda et al. | ...... | 348/315 |
| 2005/0122465 A1 * | 6/2005 | Togashi | ...... | 349/190 |
| 2007/0145425 A1 * | 6/2007 | Woo | ...... | 257/233 |
| 2008/0116537 A1 * | 5/2008 | Adkisson et al. | ...... | 257/448 |
| 2008/0218461 A1 * | 9/2008 | Sugita et al. | ...... | 345/88 |
| 2008/0251874 A1 * | 10/2008 | Ishibe | ...... | 257/432 |
| 2008/0278664 A1 * | 11/2008 | Okayama | ...... | 349/95 |
| 2009/0039454 A1 * | 2/2009 | Masuda et al. | ...... | 257/432 |
| 2009/0079019 A1 * | 3/2009 | Funao | ...... | 257/432 |
| 2009/0091760 A1 * | 4/2009 | Ehbets et al. | ...... | 356/419 |
| 2009/0174018 A1 * | 7/2009 | Dungan et al. | ...... | 257/432 |
| 2009/0212381 A1 * | 8/2009 | Crisp et al. | ...... | 257/432 |
| 2009/0283847 A1 * | 11/2009 | Kawasaki et al. | ...... | 257/432 |
| 2009/0325337 A1 * | 12/2009 | Cheng et al. | ...... | 438/70 |
| 2010/0033607 A1 * | 2/2010 | Komatsu et al. | ...... | 348/273 |
| 2010/0053407 A1 * | 3/2010 | Crisp et al. | ...... | 348/311 |
| 2010/0065897 A1 * | 3/2010 | Jun | ...... | 257/294 |
| 2010/0127157 A1 * | 5/2010 | Tamaki et al. | ...... | 250/208.1 |
| 2010/0244175 A1 * | 9/2010 | Park | ...... | 257/459 |
| 2010/0264503 A1 * | 10/2010 | Inoue et al. | ...... | 257/432 |
| 2011/0068424 A1 * | 3/2011 | Gambino et al. | ...... | 257/432 |

OTHER PUBLICATIONS

Hayes, Donald, et al., "Opto-electronic Packaging Enabled by Direct Write Microprinting Technology", *OFC* Mar. 6-11, 2005, 3 pgs.

(Continued)

*Primary Examiner* — Kaveh Kianni
(74) *Attorney, Agent, or Firm* — Blakely, Sokoloff, Taylor & Zafman LLP (57) ABSTRACT

Described herein are a method to manufacture an optical sub-module which integrates both optical (e.g., micro-lens, optical filter, micro-mirrors) and/or electrical passive devices (e.g., capacitors, inductors, resistors) and systems on a wafer level. Such integration eliminates several assembly steps and therefore improves the optical misalignment tolerance for the optical link.

5 Claims, 8 Drawing Sheets

(56) References Cited

OTHER PUBLICATIONS

Mohammed, E., et al., "Optical hybrid package with an 8-channel 18GT/s CMOS transceiver for chip-to chip optical interconnect", in *Proc. SPIE Photonic West Conference,* San Jose, Jan. 2008, 11 pgs.
Mund, Dietrich, et al., "Novel Microstructuring Technology for Glass on Silicon and Glass-Substrates", *IEEE ECTC 2004,* pp. 939-942.

Polyakov, A., et al., "Processability and Electrical Characteristics of Glass Substrates for RF Wafer-Level Chip-Scale Packages", *IEEE 2003 ECTC,* pp. 875-880.
Zoschke, Kai, et al., "Evaluation of Micro Structured Glass Layers as Dielectric-and Passivation Material for Wafer Level Integrated Thin Film Capacitors and Resistors", *IEEE 2007 ECTC,* pp. 566-573.
Zoschke, Kai, et al., "Fabrication of ASIP Devices Using Wafer Level Packaging", *IEEE Transactions on Advanced Packaging,* vol. 30, No. 3, Aug. 2007, pp. 359-368.

* cited by examiner

WAFER INTEGRATED OPTICAL SUB-MODULES

TECHNICAL FIELD

Embodiments of the invention relate to optical components. More particularly, embodiments of the invention relate to semiconductor micro electro-mechanical systems (MEMS) processing methods for integrating optical (e.g., microlens, optical filter, micro-mirrors) and electrical passive devices (e.g., capacitors, inductors, resistors) and systems on a wafer level.

BACKGROUND

Currently, when a system or component having passive optical components (e.g., micro-lenses, micro-mirrors, optical filters) is manufactured, the passive optical components are assembled discretely. Similarly, passive electrical components (e.g., interconnects, capacitors, inductors) are assembled discretely.

Existing optical system architectures and sub-assemblies for chip-to-chip optical interconnects are made by sequentially assembling several electrical and optical components and subcomponents together.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are semiconductor micro electro-mechanical system (MEMS) manufacturing techniques for integrating optical (e.g., micro-lens, optical filter, micro-mirrors) and/or electrical passive devices (e.g., capacitors, inductors, resistors) and systems on a wafer level, which may eliminate several assembly steps. This on-wafer integration significantly improves the optical misalignment tolerance for the optical link.

Discrete assembly of several optical components together may reduce the total optical alignment tolerance thereby adversely affecting the coupling efficiency to sources, detectors or waveguides or fibers. Also, fabrication of electrical passive components on chip may consume significant chip area and in some cases even interfere with the specific silicon process design rules. For package passive components such as decoupling capacitors discrete assembly may have high assembly costs with pick and place tools.

Described herein are techniques to fabricate an integrated opto-electrical sub-module that integrates passive optical and electrical components on optically transparent wafer (e.g., glass). This sub-module may be an integral component to build optical subassemblies and systems.

In one embodiment, the components to be utilized include at least: (i) an optically transparent substrate, such as glass, that has been planed, patterned, structured, etc., (ii) passive optical components, such as micro-lenses, relay mirrors, thin film filters etc., and (iii) passive electrical components, such as transmission lines, inductors, capacitors, resistors, etc.

The unit or the sub-module, once fabricated, may form an optical subassembly that may involve another sub-module consisting of active electrical and components (electronic and optical ICs). The optical passive components that could be integrated in the above sub-module are, for example, micro-lens arrays, relay mirrors, thin-film filters, etc.

Micro-lens arrays can be used for collimating/focusing light from sources or to detectors. Relay micro-mirrors reflect/steer/focus optical signals. Thin-film dielectric filters are used to single out optical signals with specific wavelengths. One application of these passive filters is for Coarse Wavelength Division Multiplexing (CWDM) architecture which combines multiple wavelengths in a single fiber.

For example electrical passive components that could be integrated on the sub-module are inductors, capacitors, resistors, etc. Inductors could be used for electrical series current peaking of either VCSEL drivers or trans-impedance amplifier (TIA) to enhance bandwidth. Typically, the inductor is placed in series with the capacitor, C, that constitutes the dominant pole. For example for TIA application Cp (capacitances from photodiode, ESD, pad, bump, etc.) constitute the dominant pole. Inductors are also used as part of an LC VCO (Voltage Controlled Oscillator) for clock or Phase-Locked Loop (PLL) application.

Integrated capacitors on sub-modules could play a critical role for decoupling, RC filter or other applications. Sub-module integrated resistors could be used for termination or as part of RC filters.

The advantage of the above is not only that these passive components could all be integrated (fabricated) on a common substrate to perform mutually supporting roles to establish an efficient system but also manufacturing them on optically transparent wafer such as glass is compatible with standard semiconductor or MEMs processing which is amenable for high volume manufacturing.

Figure 1:
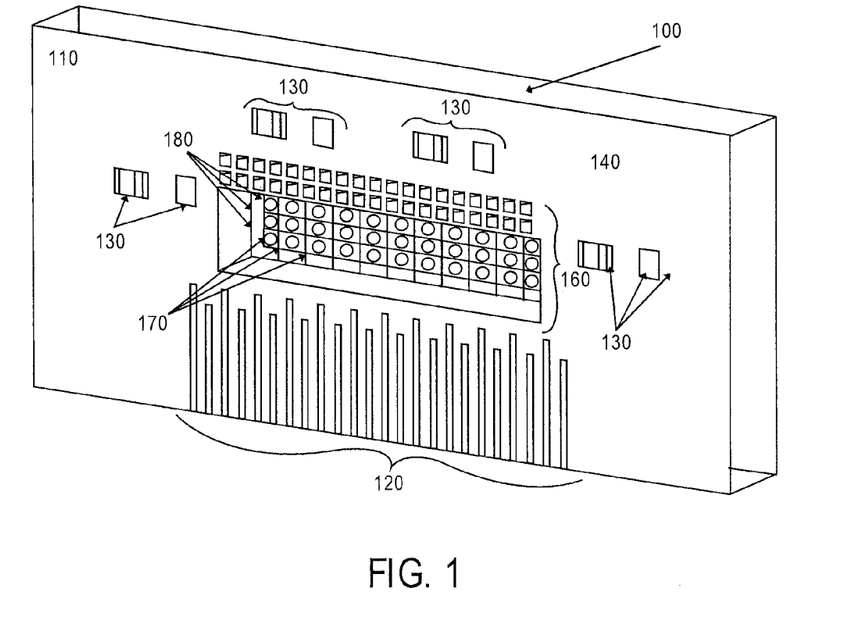
FIG. 1 is a back side view of one embodiment of an opto-electrical sub-module having an optically transparent substrate having a cavity with micro-lenses therein, metal components and passive electrical devices.

FIG. 1 is a back side view of one embodiment of an opto-electrical sub-module having an optically transparent substrate having a cavity with micro-lenses therein, metal components and passive electrical devices. The example of FIG. 1 illustrates example transmission line, filter placement, pads and component placement. However, the illustration of FIG. 1 is merely an example as other configurations can also be used.

Optically transparent substrate 100 can be glass or any other optically transparent material. In one embodiment, optically transparent substrate 100 is part of a larger die having many substrates to be used that maybe separated after the manufacturing process. Dielectric material 110 is applied to one side of substrate 100.

Transmission lines 120, passive electrical components 130 and pads 140 may be formed on dielectric 110. Any technique known in the art may be utilized to create transmission lines 120, passive electrical components 130 and pads 140. Other components may also be formed on dielectric 110.

Substrate 100 also includes cavity 160, which can be of various shapes and sizes. Cavity 160 in FIG. 1 is rectangular in shape, but other shapes (e.g., square, rhomboid, circular) may also be used. Micro-lens array 170 is disposed within cavity 160. Micro-lens array 170 may be manufactured or placed within cavity 160. Any number of micro-lenses may be included in micro-lens array 170. In one embodiment, one or more optical filters 180 may be manufactured or placed over micro-lens array 170.

As discussed in greater detail below, an electrical driver or other device may be attached to the metal (pads and/or transmission lines) on the dielectric side of substrate 100. The electrical driver may be coupled with an optical component that may utilize the optical path through the optical filters and/or micro-lenses within cavity 160.

Figure 2:
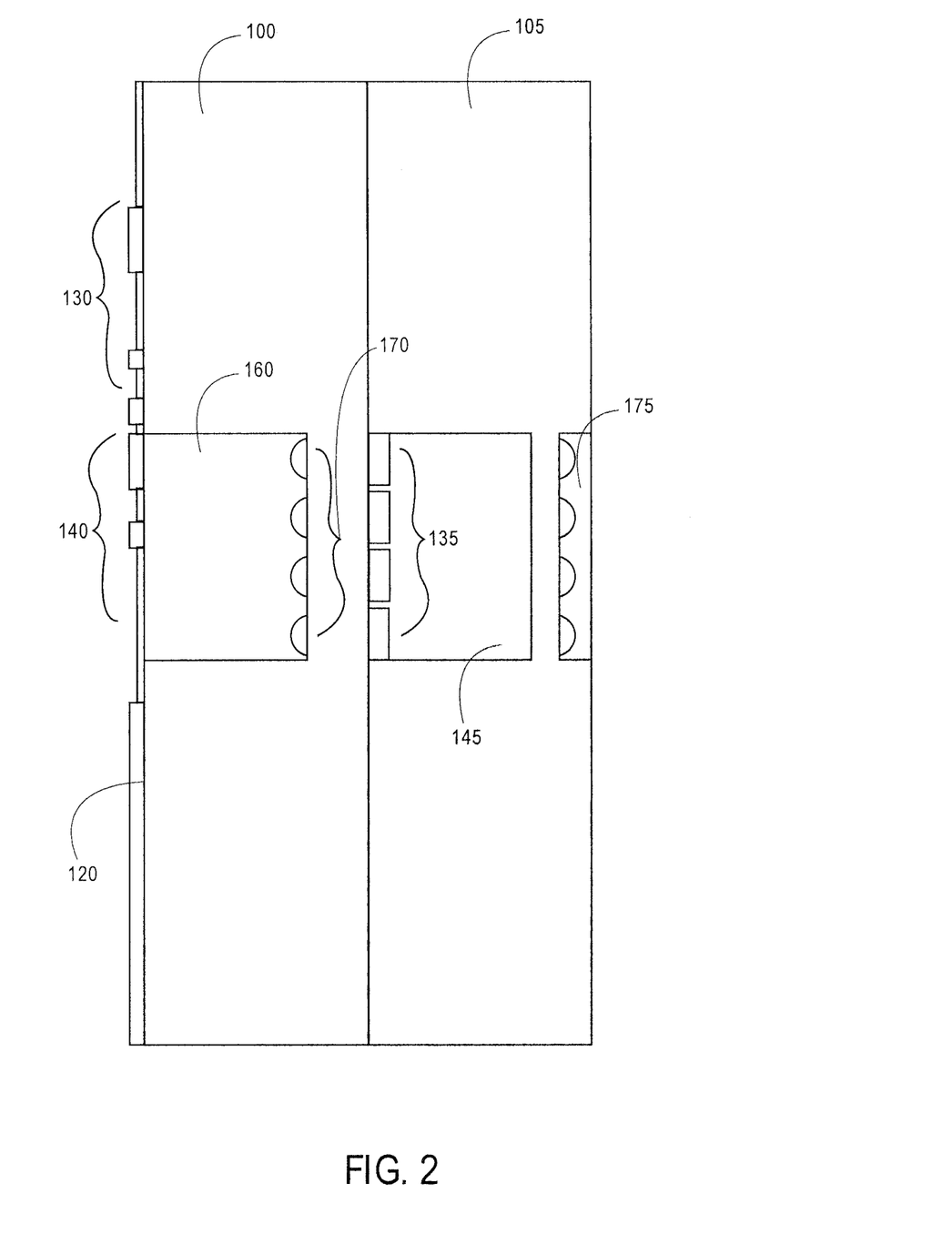
FIG. 2 is a side view of one embodiment of an opto-electrical sub-module having an optically transparent substrate having a cavity with micro-lenses therein, metal components and passive electrical devices.

FIG. 2 is a side view of one embodiment of an opto-electrical sub-module having an optically transparent substrate having a cavity with micro-lenses therein, metal components and passive electrical devices. FIG. 2 provides a side view of the substrate of FIG. 1 along with the components and features described with respect to FIG. 1. FIG. 2 further illustrates another optically transparent substrate 105 that completes one embodiment of an opto-electrical sub-module.

Substrate 105 also includes cavity 145 and optical filter array 135. In one embodiment, cavity 145 is approximately the same size and shape as cavity 160 in substrate 100. The filters of optical filter array 135 of substrate 105 are aligned with the lenses of micro-lens array 170 on substrate 100. Substrate 105 further includes micro-lens array 175 that may operate to focus light on the end(s) of one or more optical fibers (not illustrated in FIG. 2).

Figure 3:
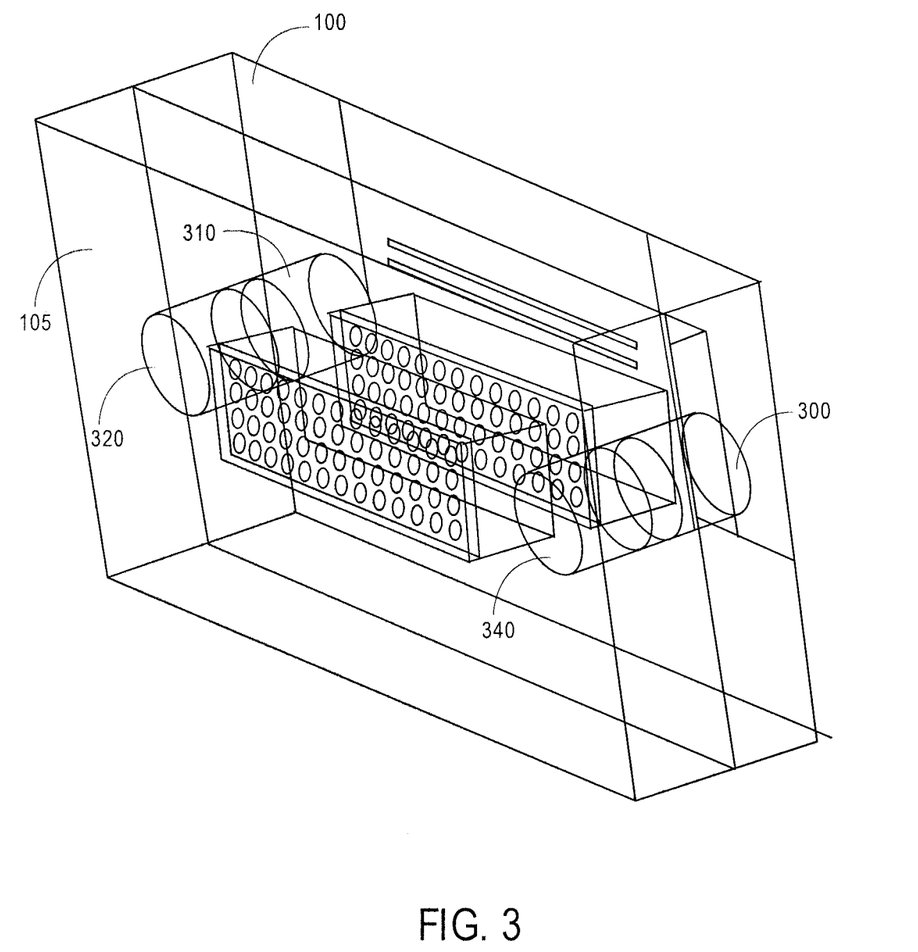
FIG. 3 illustrates one embodiment of a complete opto-electrical module having both active and passive devices.

FIG. 3 illustrates one embodiment of an opto-electrical sub-module having alignment features (e.g., holes) as well as active devices such as lasers with its CMOS driver. The components discussed above (e.g., micro-lens arrays, optical filters, cavities) may be as discussed above with the addition of one or more alignment features that may be used to align the substrates of the opto-electrical sub-module and/or may be used to align the opto-electrical sub-module with one or more optical fibers.

In one embodiment, each substrate has an alignment feature (300, 310, 320, 340) on each side of its cavity. In the example of FIG. 3, the alignment features are pass-throughs or holes that may receive a portion of an alignment tool and/or an optical fiber connector. The substrates of the opto-electrical sub-module may be attached to each other in any manner known in the art.

Figure 4:
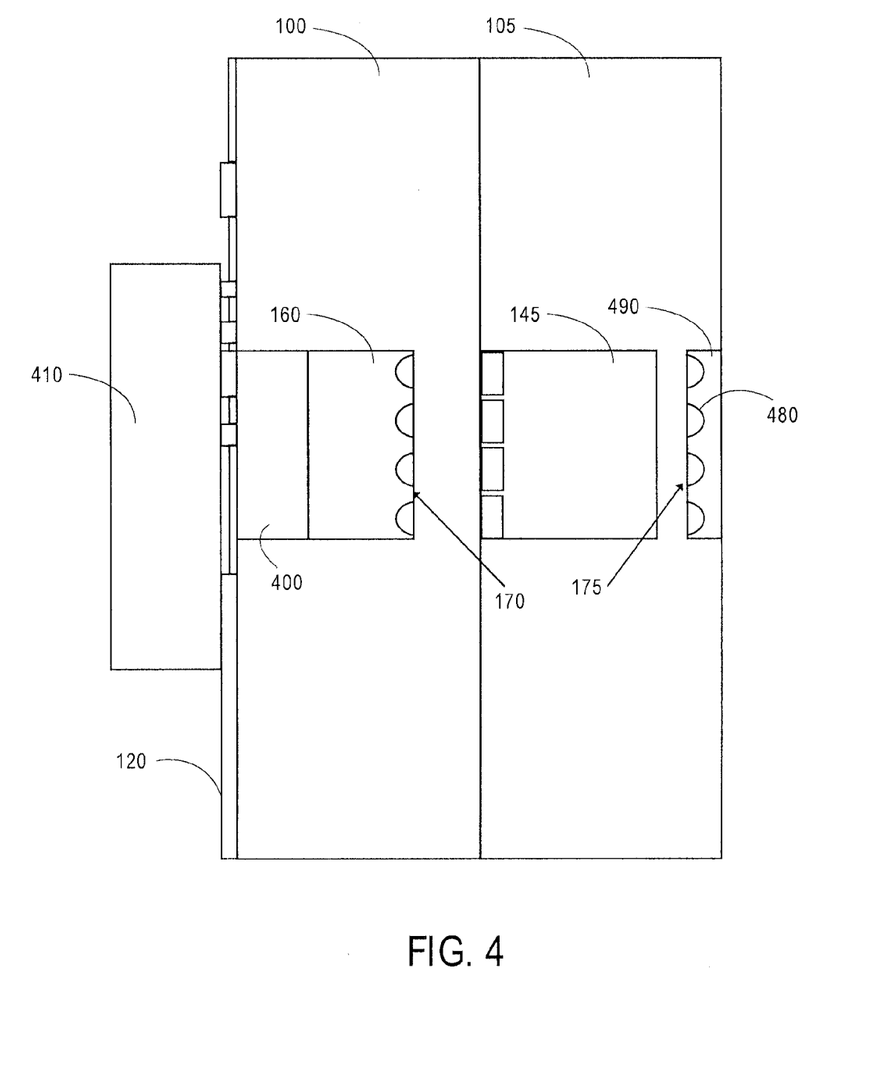
FIG. 4 illustrates one embodiment of an opto-electrical sub-module having an active optical component and associated electrical driver.

FIG. 4 illustrates one embodiment of an opto-electrical sub-module having an active optical component and associated electrical driver. The example sub-module of FIG. 4 is the same as the example sub-module of FIG. 2 with the addition of an active optical component and an electrical driver configured to drive the active optical component.

In one embodiment, active optical component 400 is disposed within cavity 160 in optically transparent substrate 100. Active optical component 400 is configured to transmit optical signals via micro-lens array 170 through cavity 145 in optically transparent substrate 105 and through micro-lens array 175 to optical fiber 480. While only one optical fiber is illustrated in FIG. 4, multiple optical fibers may be utilized in a similar manner. Active optical component 400 may be, for example, a laser or any other type of active optical component.

Electrical driver 410 is coupled with active optical component 400 to drive operation of active optical component 400. Electrical driver 410 is couple with one or more of the metal structures discussed above. For example, electrical driver 410 may be coupled with one or more of transmission lines 120 and/or one or more of pads 140. Electrical driver 410 may also be coupled with one or more of passive electrical devices 130 illustrated in FIGS. 1 and 2.

FIGS. 5a-5f illustrate one embodiment of an opto-electrical sub-module in various stages of manufacture. FIG. 5a-5f illustrate a process for completing a single sub-module. In one embodiment, the process may be applied to an optically transparent wafer where many substrates as illustrated in FIGS. 5a-5f are processed together. After completion of the processing, the wafer may be diced to achieve the individual sub-modules as illustrated.

Figure 5A:
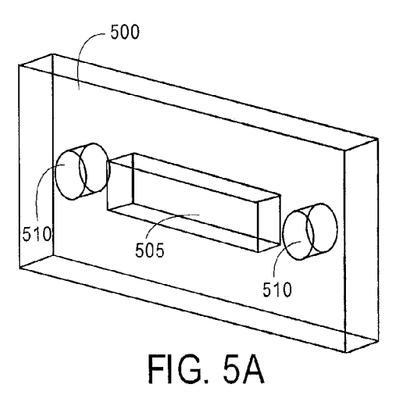
FIGS. 5a-5f illustrate one embodiment of an opto-electrical sub-module in various stages of manufacture.

FIG. 5a illustrates an optically transparent substrate having a cavity and alignment features. Cavity 505 is formed in optically transparent substrate 500 in any manner known in the art. In one embodiment, one or more alignment features 510 may also be formed in substrate 500. In the example of FIG. 5a, alignment features 510 are holes through substrate 500 on opposite sides of cavity 505. In alternate embodiments, other alignment features may also be used.

Figure 5B:
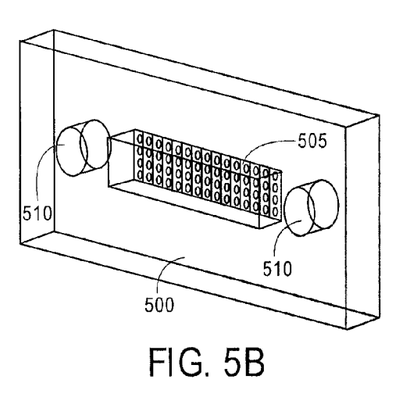

FIG. 5b illustrates the optically transparent substrate having a cavity and alignment features after a micro-lens array has been created in the cavity. In one embodiment, micro-lens array 515 is manufactured in cavity 505 in any manner known in the art. In alternate embodiments, one or more lens arrays may be placed in cavity 505.

Figure 5C:
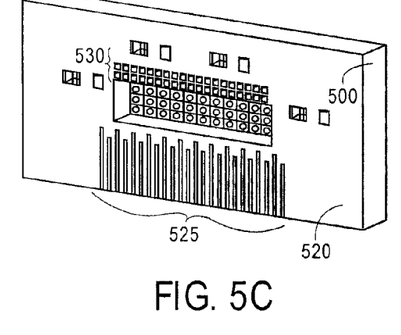

FIG. 5c illustrates the optically transparent substrate with a dielectric layer and metal layers formed on the dielectric layer. Dielectric layer 520 is placed on substrate 500 in any manner known in the art. Dielectric layer 520 provides a foundation upon which one or more metal layers may be crated. The metal layers may include, for example, transmission lines 525 and pads 530. Other structures including metal layer may also be created on dielectric layer 520, for example, passive electric devices, as discussed above.

Figure 5D:
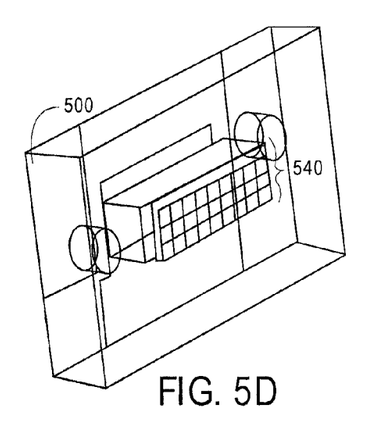

FIG. 5d illustrates the optically transparent substrate with the dielectric layer with one or more optical filters. Optical filters 540 may be fabricated on substrate 500, or optical filters 540 may be thin film filters that have been attached to substrate 500. Note that optical filters 540 are on the opposite face of substrate 500 as compared to dielectric layer 520.

Figure 5E:
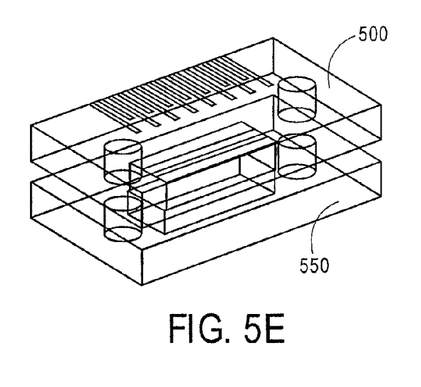

FIG. 5e illustrates the optically transparent substrate attached to a cover wafer. In one embodiment, the rear face of substrate 500 (i.e., the face having optical filters 540) is attached to cover wafer 550. In one embodiment, cover wafer 550 includes alignment features that correspond to alignment features 510 of substrate 500. In one embodiment, cover wafer 550 further includes a cavity and/or a micro-lens array as illustrated in FIGS. 2 and 4, discussed above.

Figure 5F:
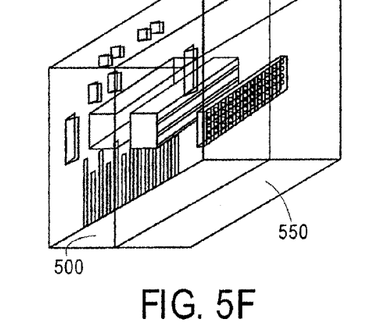

FIG. 5f provides a perspective view of one embodiment of an opto-electrical sub-module. The opto-electrical sub-module may then be aligned with one or more optical fibers (not illustrated in FIG. 5f) using the alignment features and/or other alignment techniques.

Figure 6:
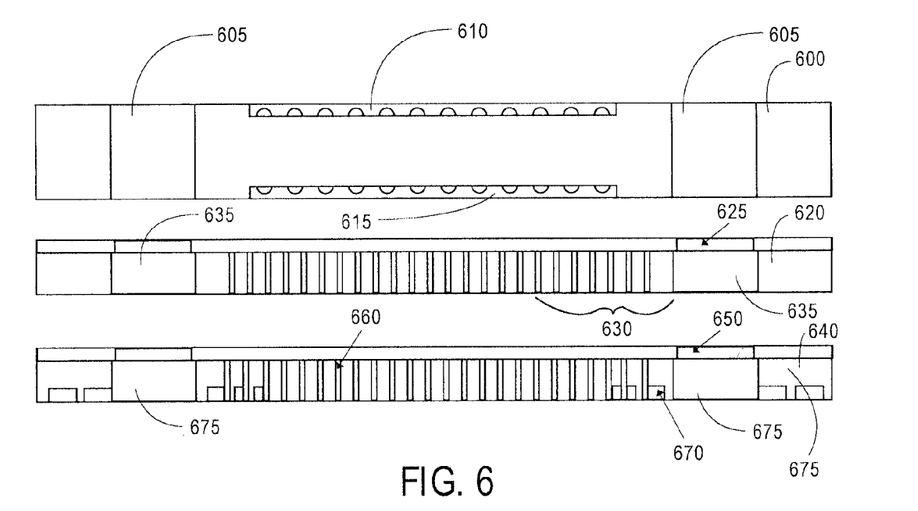
FIG. 6 is an illustration of an opto-electrical sub-module having three wafers.

FIG. 6 is an illustration of an opto-electrical sub-module having three wafers. In one embodiment, an opto-electrical sub-module having three wafers may include a lens array wafer, a first input/output (I/O) wafer and a second I/O wafer. The two I/O wafers provide electrical signals and/or power and ground for electronic components.

Micro-lens array wafer 600 includes micro-lens array 610 and micro-lens array 615. The lenses in micro-lens array 610 are aligned with corresponding lenses in micro-lens array 615. In one embodiment, micro-lens array 610 and micro-lens array 615 are created within cavities on opposite sides of micro-lens array wafer 600. In one embodiment, micro-lens array wafer 600 includes one or more alignmeant features 605.

I/O wafer 620 includes a metal plane 625, which may function as a power or ground plane. I/O wafer 620 further includes one or more through glass vias (TGVs) 630 that may provide access to metal plane 625 from the opposite side of I/O wafer 620. In one embodiment, I/O wafer 620 further includes one or more alignment features 635. I/O wafer 620 further includes a hole corresponding to the area of micro-lens array 615 of micro-lens array wafer 600.

I/O wafer 640 includes a metal plane 650, which may function as a power or ground plane. I/O wafer 640 further includes one or more through glass vias (TGVs) 660 that may provide access to metal plane 650 from the opposite side of I/O wafer 640. In one embodiment, I/O wafer 640 further includes one or more alignment features 675. I/O wafer 640 further includes a hole corresponding to the area of micro-lens array 615 of micro-lens array wafer 600.

I/O wafer 640 may further include one or more metal features on the opposite side of I/O wafer 640 from metal plane 650. The metal features may include, for example, one or more transmission lines, one or more pads, one or more passive electronic components, or any combination thereof.

Figure 7:
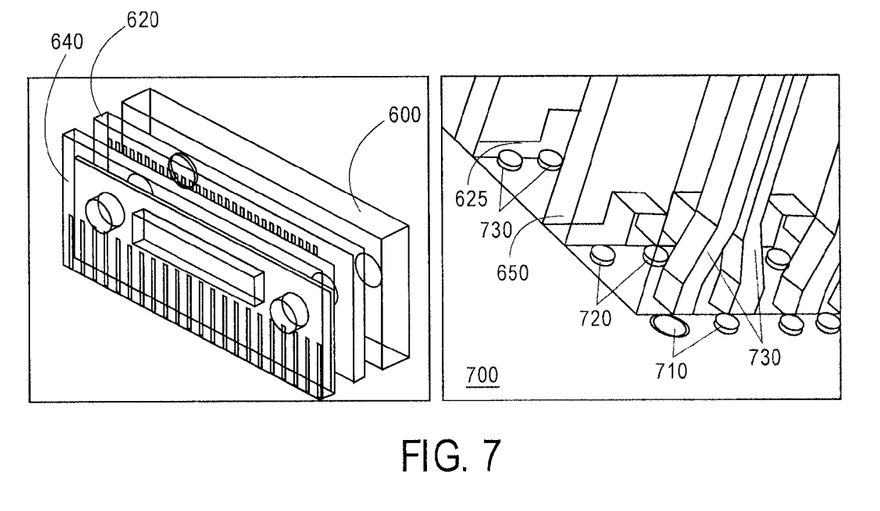
FIG. 7 illustrates an interface between an opto-electrical sub-module having three wafers and an electronic component such as printed circuit board (PCB).

FIG. 7 illustrates an interface between an opto-electrical sub-module having three wafers and an electronic component. The metal contacts or interface of the opto-electrical sub-module may be placed in contact with an electronic component, for example, an integrated circuit (IC) with a ball grid array (BGA), or any other type of electrical interface.

Interconnect lines 670 from I/O wafer 640 align with and connect to corresponding signal pins 710 on IC 700. Metal plane 650, which may function as a ground plane, aligns with and connects to corresponding ground pins 720. Similarly, metal plane 625, which may function as a power plane, aligns with and connects to corresponding power pins 730. Connections may be made between the pins and the opto-electrical sub-module in any manner known in the art.

Figure 8:
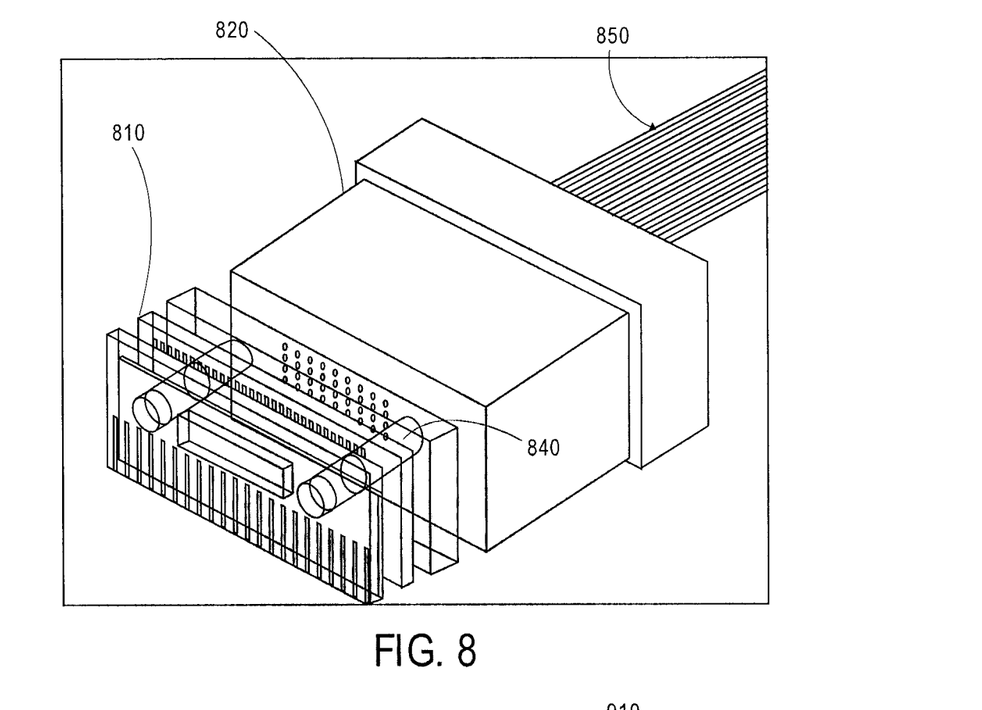
FIG. 8 illustrates a opto-electrical sub-module aligned with an optical fiber array having a connector with alignment features.

FIG. 8 illustrates a opto-electrical sub-module aligned with an optical fiber array having a connector with alignment features. Module 810 represents one of the opto-electrical sub-modules described above. The example of FIG. 8 illustrates a module having three wafers; however, other opto-electrical sub-module embodiments can be utilized in a similar manner.

Connector 820 is a connector used to terminate one or more optical fibers and provide an interface though which optical signals carried by the one or more optical fibers can be transmitted. In one embodiment, connector 820 includes at least one lens for each optical fiber terminated by connector 820. Any type of connector known in the art may be used.

In one embodiment, connector 820 includes alignment pin 840. Alignment pin 840 may be received by corresponding holes in module 810. In alternate embodiments, connector 820 may have holes to receive corresponding pins on module 810. In other embodiments, other alignment features may be used.

Fiber array 850 may be a group of any number of optical fibers terminated by connector 820. The optical fibers of fiber array 850 may carry optical signals to and from module 810.

Figure 9:
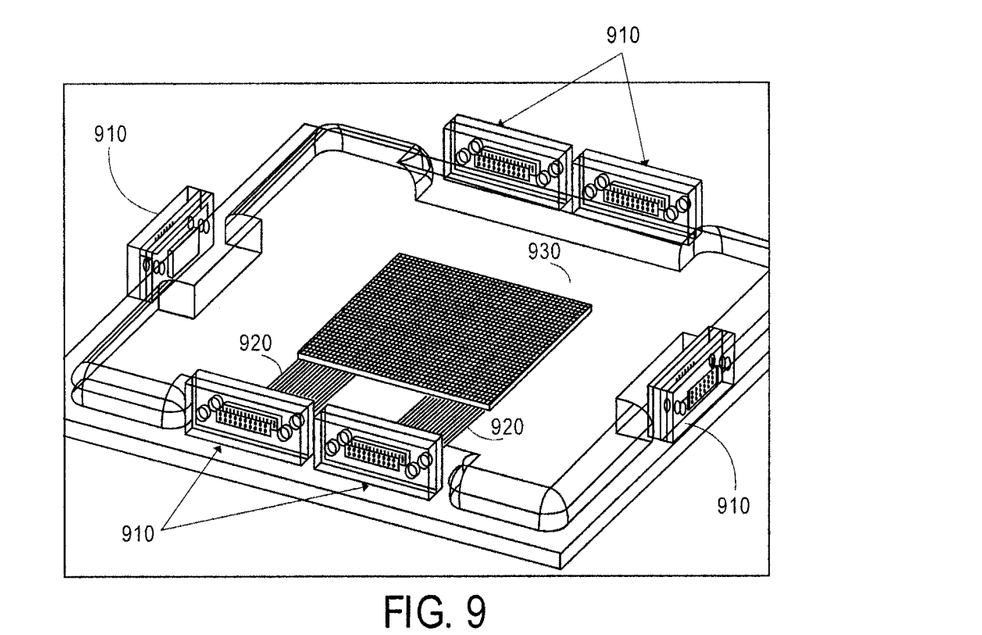
FIG. 9 illustrates one embodiment of an electronic system/component having multiple interfaces including opto-electronic sub-modules as described herein.

FIG. 9 illustrates one embodiment of an electronic system/component having multiple interfaces including opto-electronic sub-modules as described herein. The example of FIG. 9 may represent, for example, a processor or a group of processor cores within a larger system. The processor or processor cores may be interconnected with optical fibers and utilize opto-electronic sub-modules between the optical fibers and the processor or processor cores. Other system components, for example, memories, network interfaces, output devices may be interconnected in a similar manner.

Electrical component 930 may be any type of electrical component within a system. For example, electrical component 930 may be a processor or an integrated circuit package housing multiple processing cores. Alternatively, electrical component 930 may be any other type of electrical component.

Electrical component 930 is eclectically connected to modules 910 via electrical traces 920. For simplicity of illustration not all electrical traces have been included in FIG. 9. In one embodiment, modules 910 include components to convert between optical and electrical signals. Optical fibers arrays having connectors as described with respect to FIG. 8 may be connected to modules 910 to provide communications channels between system components, or between systems, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    an optically transparent substrate having a cavity which opens to a first side of the optically transparent substrate, wherein the cavity extends from the first side toward a second side of the optically transparent substrate, wherein the optically transparent substrate forms a bottom of the cavity between the first side and the second side;
    a two-dimensional micro-lens array within the cavity, wherein the micro-lens array is disposed on the bottom of the cavity;
    multiple layers of metal materials formed on the first side of the optically transparent substrate;
    passive electrical components formed on the first side of the optically transparent substrate; and
    thin-film dielectric optical filters on the second side of the optically transparent substrate.

2. The apparatus of claim 1 further comprising a cover glass component having micro-lens arrays aligned with the optically transparent substrate.

3. The apparatus of claim 2 further comprising an optical fiber aligned with the micro-lens array of the cover glass component.

4. The apparatus of claim 1 further comprising an active electrical component coupled with at least a portion of the metal materials and aligned with the two-dimensional micro-lens array.

5. The apparatus of claim 1 wherein the metal materials provide at least a power plane, a ground plane and a plurality of electrical traces.

* * * * *